United States Patent
Chalise et al.

(10) Patent No.: US 9,852,573 B2
(45) Date of Patent: Dec. 26, 2017

(54) CONSTRAINED POWER VENDING SYSTEM

(71) Applicant: CI Data Pty Ltd, Chipping Norton, New South Wales (AU)

(72) Inventors: Arati Chalise, Werrington (AU); Christopher Newman, West Ryde (AU); Geoffrey Hancock, Richmond (AU); Hui Ke, Moorebank (AU); Ike Yuan, Padstow (AU); Rajni Garg, Moorebank (AU); Rusiri Kahatapitiya, Forestville (AU); Peter Stone, Ferntree Gully (AU); Ivan Vernot, Toongabbie (AU); Roger Mathew Trick, St Peters (AU); Yang Yun, Liverpool (AU)

(73) Assignee: CI Data Pty Ltd, Chipping Norton, New South Wales (AU)

( * ) Notice: Subject to any disclaimer, the term of this patent is extended or adjusted under 35 U.S.C. 154(b) by 0 days.

(21) Appl. No.: 15/177,689

(22) Filed: Jun. 9, 2016

(65) Prior Publication Data

US 2016/0364930 A1 Dec. 15, 2016

(30) Foreign Application Priority Data

Jun. 12, 2015 (AU) ................................ 2015902211

(51) Int. Cl.
*G07F 11/62* (2006.01)
*G05B 15/02* (2006.01)
*F17C 1/00* (2006.01)

(52) U.S. Cl.
CPC .............. *G07F 11/62* (2013.01); *G05B 15/02* (2013.01); *F17C 1/00* (2013.01); *F17C 2221/035* (2013.01)

(58) Field of Classification Search
CPC ................................................ E05B 2047/0071
USPC .......... 70/263, 277, 278.1, 262; 700/231-242
See application file for complete search history.

(56) References Cited

U.S. PATENT DOCUMENTS

| | | | | |
|---|---|---|---|---|
| 3,179,224 A | * | 4/1965 | Haupt, Sr. ............. | G07F 7/0609 194/226 |
| 6,404,609 B1 | * | 6/2002 | Mansfield ........ | H03K 17/08146 361/103 |
| 6,474,502 B2 | * | 11/2002 | Mc Cord .............. | G07F 7/0609 221/131 |
| 6,761,194 B1 | * | 7/2004 | Blong ..................... | G07F 17/12 221/312 R |
| 8,876,172 B2 | * | 11/2014 | Denison .............. | E05B 47/0012 292/144 |

(Continued)

*Primary Examiner* — Timothy Waggoner
(74) *Attorney, Agent, or Firm* — Merchant & Gould P.C.

(57) ABSTRACT

Disclosed is a vending system for supply of product from a plurality of containers each having a corresponding access door having an electrically activatable lock arrangement 200. The system has an interface module by which a predetermined maximum electrical power is made available for supply to the containers and lock arrangements such that each lock arrangement has a plurality of operational modes. The modes include: an active mode by which the lock arrangement is activatable in response to a vending instruction; a standby mode by which the lock arrangement awaits a vending instruction; and a sleep mode by which the lock arrangement minimises power drawn from the interface module. The interface module operates the lock arrangements in the standby mode and the interface module operates at least one lock arrangement in the sleep mode, and at least one lock arrangement in the active mode.

13 Claims, 13 Drawing Sheets

(56) References Cited

U.S. PATENT DOCUMENTS

| | | | |
|---|---|---|---|
| 9,275,508 B1 * | 3/2016 | Lavra | G07F 11/005 |
| 9,390,575 B1 * | 7/2016 | Clark | G07F 5/26 |
| 2007/0170201 A1 * | 7/2007 | Steffens | G07F 7/0609 |
| | | | 221/265 |

* cited by examiner

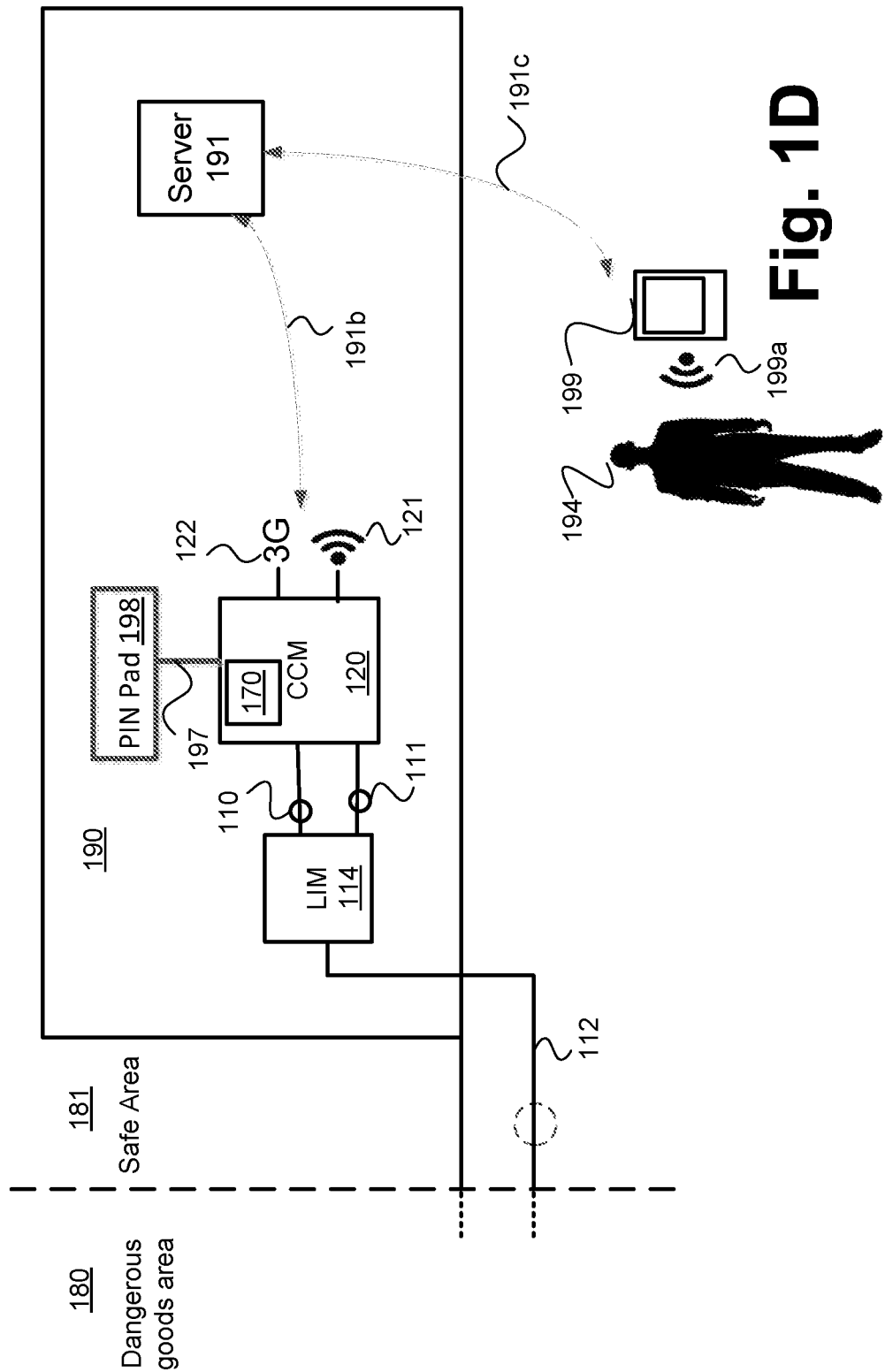

CONSTRAINED POWER VENDING SYSTEM

REFERENCE TO RELATED APPLICATIONS

This application claims the benefit under 35 U.S.C. §119 of the filing date of Australian Patent Application No. 2015902211, filed 12 Jun. 2015, hereby incorporated by reference in its entirety as if fully set forth herein.

TECHNICAL FIELD

The present invention relates generally to vending systems and, in particular to those configured for use in distributing hazardous substances and products.

BACKGROUND

Vending machines are well known and have been in use for over a century. Modern vending machines can be implemented in an electrical and/or mechanical fashion and can vary in size depending on the product they offer, often food or beverage for human consumption. Vending machines provide an advantage in that an attendant is not required in order to sell their products. The products are automatically dispensed upon receipt of the customer's payment. The payment of a product in a vending machine is either in the form of coins and bills, or from credit card transactions. Vending machines provide the advantage where a customer can purchase a product at any time, and restocking of the machine can be done during off peak hours.

However significant problems arise when it is desired to vend hazardous substances and products, such as domestic bottled gas, including LPG. In such situations, use of electricity and electro-mechanical apparatus' within a defined safety zone about the hazardous substance can breach safety standards and regulations established to prevent fire and/or explosion of the hazardous substance.

These problems have been addressed with respect to bottled gas vending, by systems such as those implemented by Sleegers, Siraga, or Vidr which dispense gas bottles via a pneumatic system. The operation of these vending machines via pneumatics allows the machines to operate electricity free in the specified safety zone proximate the gas bottles. However using pneumatics is costly for installation and maintenance, and requires the replacement of the compressed non-volatile gases used to operate the pneumatics.

SUMMARY

It is an object of the present invention to substantially overcome, at least ameliorate, one or more disadvantages of existing arrangements.

According to one aspect of the present disclosure there is provided a vending system for supply of product from a plurality of containers each having a corresponding access door having an electrically activatable lock arrangement, the system comprising an interface module by which a predetermined maximum electrical power is made available for supply to the containers and lock arrangements such that each lock arrangement has a plurality of operational modes, the modes comprising:

an active mode by which the lock arrangement is activatable in response to a vending instruction;

a standby mode by which the lock arrangement awaits a vending instruction; and a sleep mode by which the lock arrangement minimises power drawn from the interface module;

wherein the interface module operates the lock arrangements in the standby mode; and the interface module operates at least one lock arrangement in the sleep mode, and at least one lock arrangement in the active mode.

Desirably the interface module operates all lock arrangements in the standby mode; and then operates all the lock arrangements except a singular lock arrangement in the sleep mode and the singular lock arrangement in the active mode.

Preferably the interface module is located within a first area and the plurality of containers are located within a second area, separated from the first area, in which the second area has access to a limited maximum of electrical power.

Typically the lock arrangement comprises a lock controller which controls a door locking mechanism of the corresponding container. The lock controller generally receives operational modes from the interface module and decodes the modes for operation of the lock controller.

Desirably the interface module is a predetermined minimum distance from the plurality of containers, thus contributing to intrinsically safe operation.

Generally the vending system according to claim 2 wherein the interface module communicates to the lock arrangement with a communication protocol at a limited frequency.

According to another aspect of the present disclosure there is provided apparatus comprising:

a plurality of controllers each associated with a corresponding activatable latch, each controller being configured to cause actuation of the corresponding latch; and an interface module by which a predetermined maximum amount of electrical power is made available for supply to the plurality of controllers and latches, wherein each controller is operable in at least two operational modes, the modes comprising:

an active mode by which the controller actuates the corresponding latch; and a standby mode by which the controller awaits instructions from the interface module, such that any combination of the operational modes is within the predetermined maximum amount of electrical power.

Preferably the apparatus further comprises a sleep mode by which the controller minimises power usage from the interface module.

Desirably the interface module is located within a first area and the plurality of control modules are located within a second area, separated from the first area, in which the second area has access to a limited maximum of electrical power.

In a preferred implementation the apparatus further comprises:

a vending unit by which vending commands are issued according to the operational modes; and a communications network interconnecting the vending controller and each of the controllers via the interface module and adapted to convey the vending commands to cause operation of the controller and corresponding latches according to the operational modes wherein the interface module is configured to provide electrical isolation between the vending unit and the controllers and latches with respect to the communications network and the supply of the electrical power to the controllers and latches.

In another aspect, disclosed is a method for operating a plurality of devices in a limited maximum electrical power environment, by which a standby amount of power is consumed by each device, such that the total power consumed by the plurality of devices is less than the limited maximum, the method comprising the steps of:

receiving a command at the plurality of devices from a controller;

determining to which of the plurality of devices the command is addressed;

decoding the addressed command into an action based on the command such that each command results in one of at least two actions:

sleep, by which substantially reduced electrical power consumption compared to the standby amount of power is consumed by a device; and activate, by which electrical power consumption sufficient to operate one of the plurality of devices is consumed by that one device;

wherein the total power consumed by the plurality of devices during an activate action is less than the limited maximum.

The method may further comprise the steps of:

receiving a operate status query from the controller; and sending the operate status to the controller.

In yet another aspect, disclosed is a method for supply of a product in a limited maximum electrical power environment, the environment including a plurality of containers each having an electric locking device, the method comprising the steps of:

placing all but one of the plurality of containers in a relatively low power consumption mode;

activating the one container to a relatively high power consumption mode to supply the product from the one container, such that the total power consumed by the plurality of containers is constrained within the limited maximum for all consumption modes of operation of the containers.

In yet another aspect, disclosed is a system for supply of product, the system comprising: a communications network; a keypad configured to receive input of a transaction-specific number; a server computer configured to: communicate information relating to a plurality of containers of the product to a customer device via the communications network, each of the plurality of containers associated with a corresponding activatable latch arrangement; receive, via the communications network, an order relating to one of the plurality of containers from the customer device; transmit, via the communications network, a transaction-specific number relating to the received order; and transmit, via the communications network, information relating to the one container upon receiving and verifying the transaction-specific number; and apparatus, in communication with the server computer via the communications network, and in wired communication with the keypad, the apparatus configured to: receive the transaction-specific number from the keypad; transmit the transaction-specific number to the server computer for verification via the communications network; and actuate the latch arrangement of the one container upon receiving the transaction-specific number from the server via the communications network; the apparatus comprising: a plurality of controllers each associated with a corresponding one of the activatable latch arrangements, each controller being configured to cause actuation of the corresponding latch arrangement; and an interface module by which a predetermined maximum amount of electrical power is made available for supply to the plurality of controllers and latch arrangements, wherein each controller is operable in at least two operational modes, the modes comprising: an active mode by which the controller actuates the corresponding latch arrangement; and a standby mode by which the controller awaits instructions from the interface module, such that any combination of the operational modes is within the predetermined maximum amount of electrical power.

Other aspects are also disclosed.

BRIEF DESCRIPTION OF DRAWINGS

At least one embodiment of the present invention will now be described with reference to the drawings in which:

FIG. 1D shows another implementation including a self-service arrangement;

DETAILED DESCRIPTION INCLUDING BEST MODE

Figure 1A:
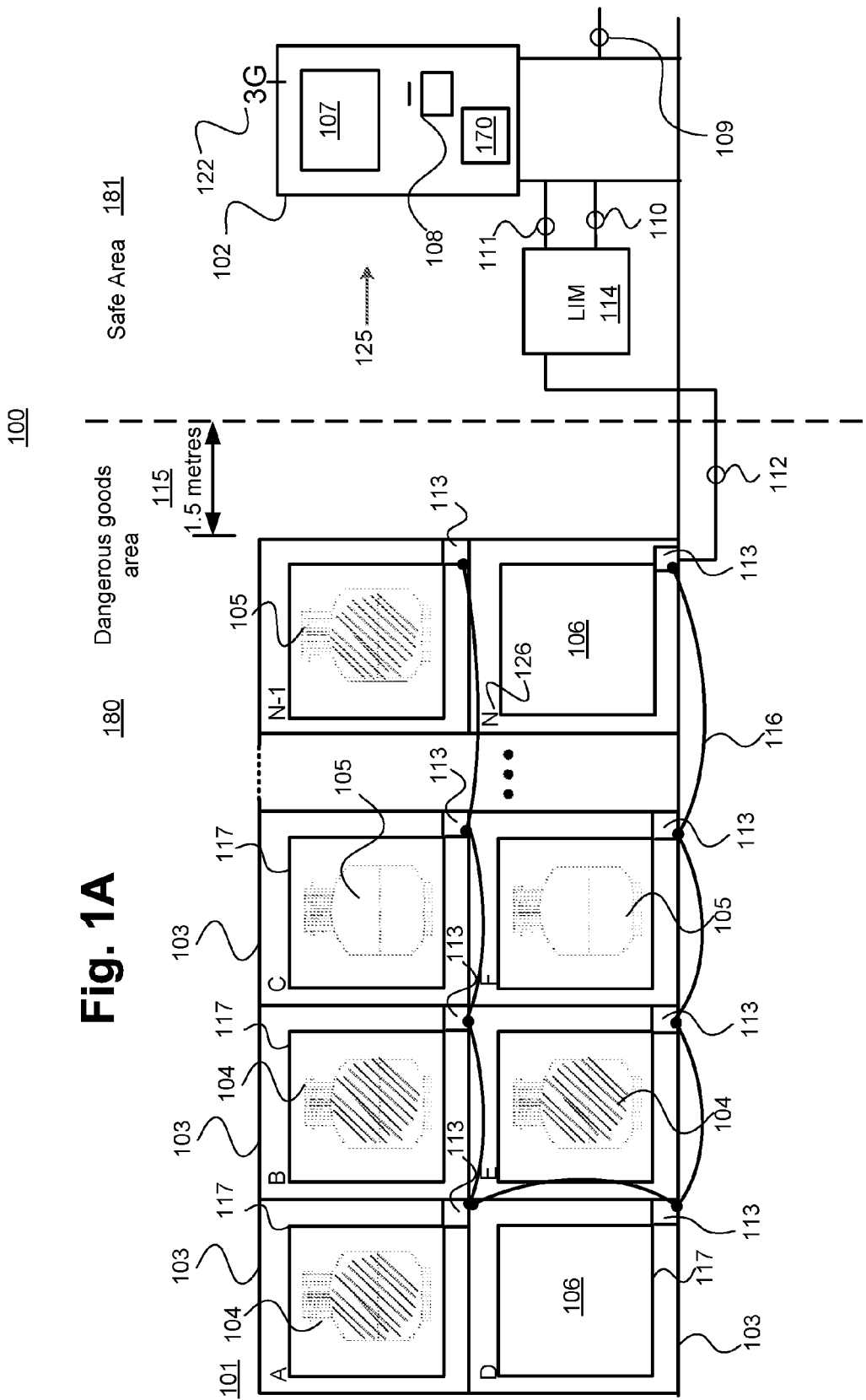
FIG. 1A shows a schematic representation of a vending system having a locker style container arrangement and a kiosk.

FIG. 1A shows a gas bottle vending system 100 in which a vending container arrangement 101 is configured within a dangerous goods area 180. The system 100 also includes a control arrangement 125 configured within a safe area 181 arranged a predetermined safe distance 115 from the dangerous area 180. The control arrangement 125 includes a kiosk 102 and a latch interface module (LIM) 114. The LIM 114 operates to provide an intrinsically safe electrical and communications interconnection between the vending container arrangement 101 in the hazardous area 180 and common electrical apparatus configured in the safe area 181, thereby permitting safe electrical operation of the vending system 100. The container arrangement 101 is formed in this example of two stacked rows of containers 103, each having a corresponding door 117, arranged in a locker style configuration. The containers 103 are shown alphabetically labelled, with the final container labelled "N" 126, which indicates that the number of containers 103 in the vending system 100 can vary.

The kiosk 102 shown in the safe area 181 has a graphical user interface (GUI) 107 via which a customer interacts with the kiosk 102 and the vending system 100. The customer can purchase a new bottle, or return a used bottle, typically associated with the purchase of a new bottle through the authorizing of a credit card transaction via a credit card reader 108. The kiosk 102 communicates the credit card transaction with a financial institution (not illustrated), for example via a 3G network connection 122. The kiosk 102 also utilises the 3G network connection to communicate an inventory database of the vending system 100 to the vending retailer. The kiosk 102 can be supplied with AC power 109 (e.g.: 240 Vac) and routes communications through the latch interface module (LIM) 114 using an integrated technology (IT) system connection 110. The kiosk 102 also supplies power 111 to the latch interface module 114, preferably via a two conductor 14 volt DC supply. This power supply is not limited to 14 VDC, and could be supplied by an AC source, or other voltage levels of DC sources. As detailed in FIG. 1B, the latch interface module 114 couples to the container arrangement 101 via a conduit 112 which contains a two-wire communications twisted pair 134, and a two conductor DC power supply 135. The conduit from the LIM 114 to the container arrangement 101 may be underground, above ground or overhead subject to the particular installation. Control and management of operation of the vending arrangement 101 is managed by a controlling processor 170 within the kiosk 102.

Returning to FIG. 1A, the distance 115 from the latch interface module 114 to the dangerous goods area 180 is desirably a minimum of 1.5 metres in order to comply with IECEx standards relating to equipment for use in explosive atmospheres (IEC 60079-0: 2011, and IEC 60079-11:2011). Each container 103 has a corresponding container door lock controller (CDLC) 113, and a daisy chain wiring scheme 116 is provided which sequentially connects the CDLCs 113 to the LIM 114. This daisy chain connection 116 allows communications from the controlling processor 170 via the LIM 114 to all of the CDLCs 113 with minimum wiring and ease of installation. The controlling processor 170 controls the CDLCs 113 to control opening of each corresponding container door 117.

As seen in FIG. 1A, a full gas bottle 104 is available for purchase stored inside of the container 103 behind doors 117 labelled "A", "B", and "E". An empty (or used) gas bottle 105 is shown having been returned to containers labelled "C", "F", and "N−1" by a customer who has swapped for a full gas bottle. An empty container 106 in containers labelled "N" and "D" show that a customer has purchased a gas bottle without returning a used bottle.

Figure 1B:
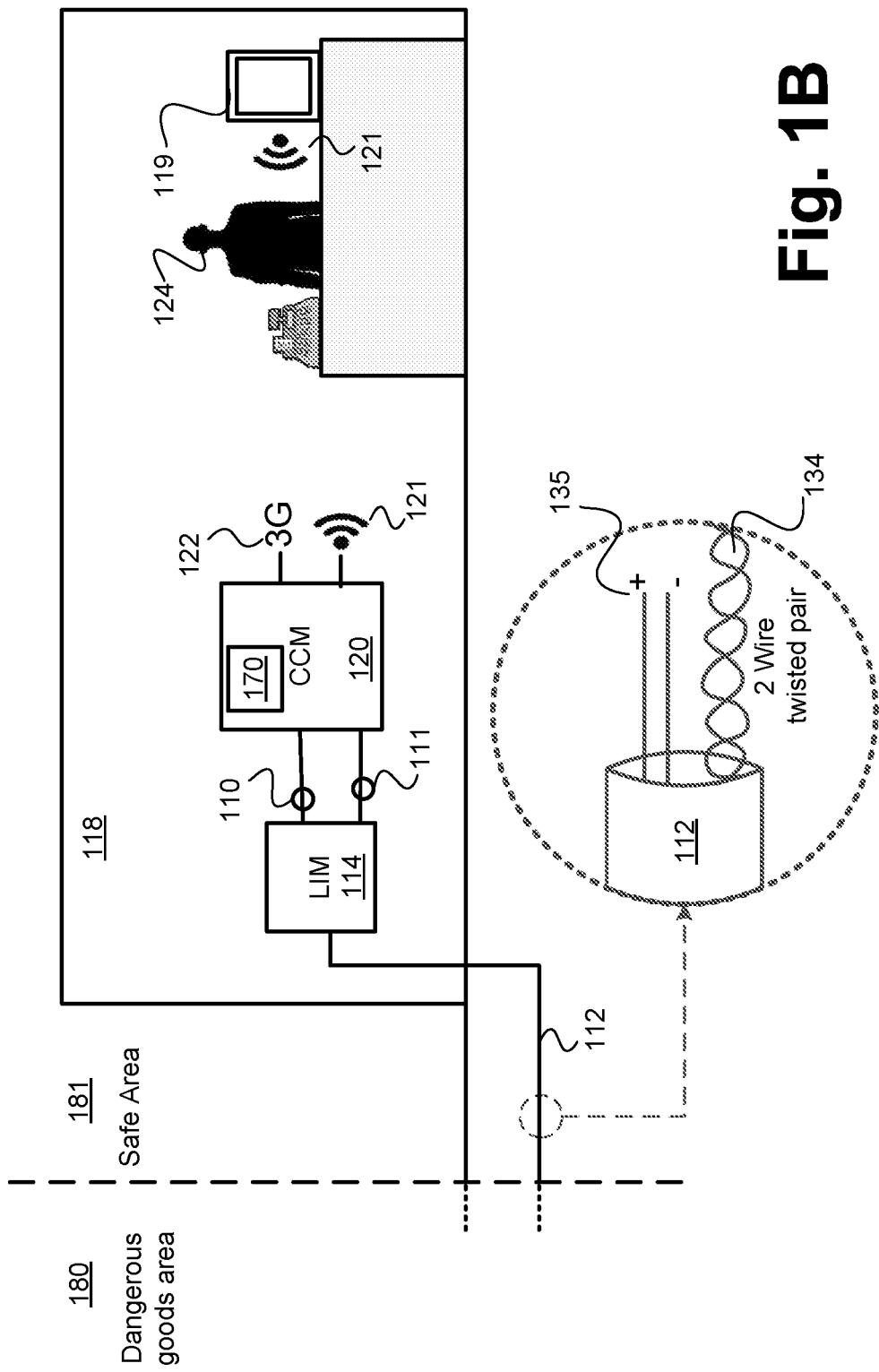
FIG. 1B shows an alternative implementation including a vendor in a service station.

FIG. 1B shows a similar system as FIG. 1A, but where the kiosk 102 is replaced by a service station configuration 118 which is operated by a shop keeper 124. In the service station configuration 118, the customer pays the shop keeper 124 who then activates the purchase via an application executing on a tablet computer device 119, which communicates to a container control module (CCM) 120 via a wireless interface 121. The CCM 120 also has 3G capability 122 to communicate the inventory database to the vending retailer. The CCM 120, like the kiosk 102, also includes a controlling processor 170. The CCM 120 interfaces with the LIM 114 and supplies a 14 volt DC power supply 111. Similar to the LIM 114 supplied by the kiosk 102, the supply from the CCM 120 is not limited to 14 VDC, and could be supplied by an AC source, or other voltage levels of DC sources. The CCM 120 also connects to the LIM 114 with an IT interface connector 110. The LIM 114 then connects to vending arrangement 101 as in FIG. 1A.

Figure 1C:
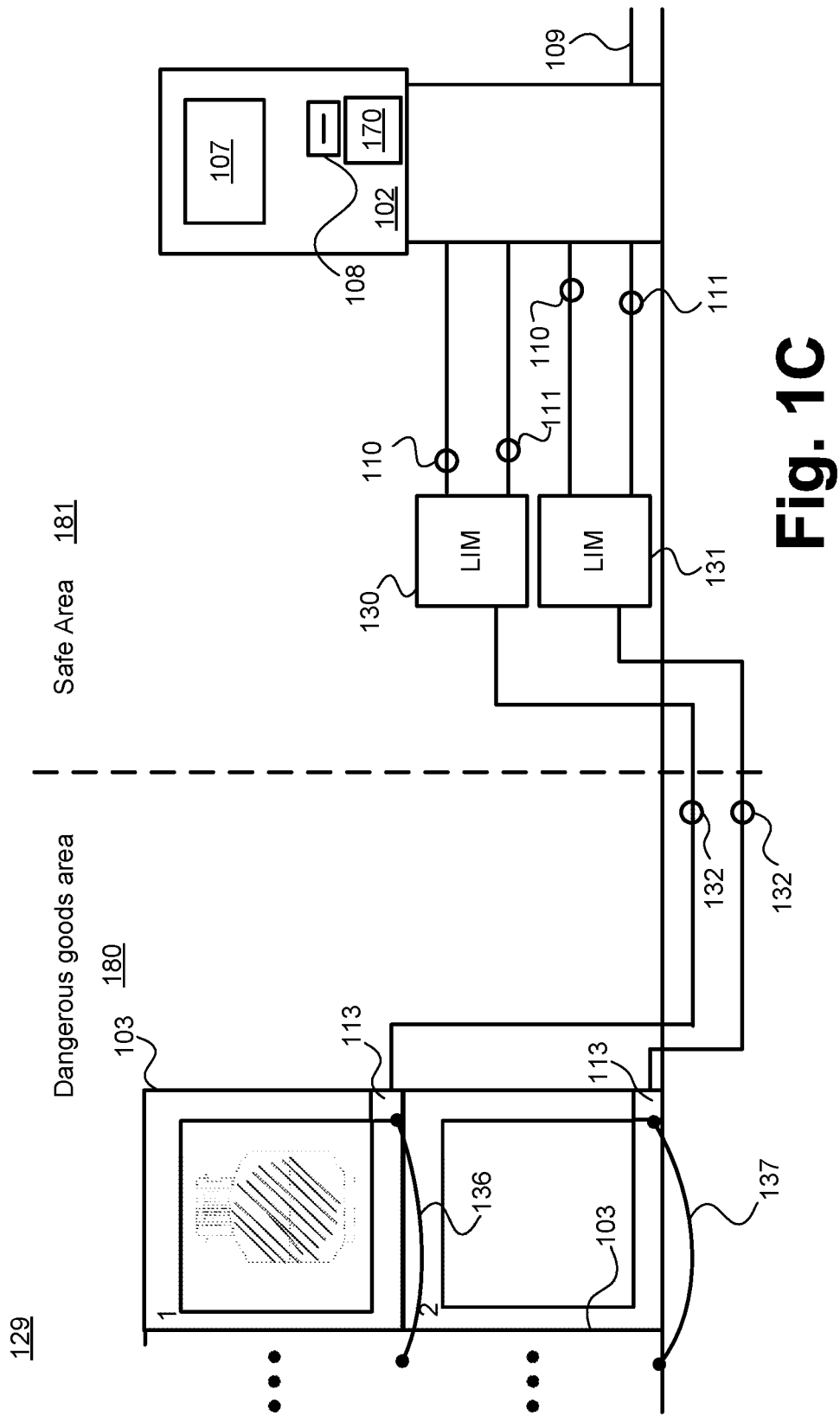
FIG. 1C shows another implementation in which multiple controllers each control a respective separate row of containers.

FIG. 1C shows a further arrangement, generally similar to FIG. 1A. Here, a kiosk 102, connects to two LIMs 130 and 131, which in turn then connect to corresponding daisy chains 136 and 137 in the dangerous goods area 180.

FIG. 1D shows a further arrangement, generally similar to FIG. 1B. However, in contrast to FIG. 1B, the service station configuration is replaced by a self-service configuration 190. The self-service configuration 190 includes a server computer 191, and a security console 198, typically a Personal Identification Number (PIN) pad. The server 191 is typically remote from the CCM 120 and the PIN pad 198 and located outside the hazardous area 180. The server 191 is typically in communication with the CCM 120 by a connection 191b The connection 191b is provided by a wireless network. In some arrangements, the connection 191b may be a combination of wired and wireless networks. For example, the connection 191b may include a wired connection and a connection with one of the 3G capability 122 and the wireless interface 121.

The PIN pad 198 is normally a standard keypad as used in the security industries, for example a model AYC-Q60 as manufactured by Rosslare Security Products. The PIN pad 198 is connected via at least one physical connection 197 to the CCM 120. The PIN pad is typically located in the vicinity of the CCM 120, and outside of the hazardous area 180.

A customer 194 operates a mobile communication device 199 to use the self service configuration 190 to purchase a gas bottle, as described below in relation to FIG. 8. In the preferred arrangements described herein, the LIMs are configured, as will be detailed below, to each supply a maximum of 24 of the containers 103 and corresponding CDLC 113. In this fashion, in the arrangements of FIGS. 1A and 1B, a total of 24 containers 103 may be configured in the arrangement 101, whereas in FIG. 1C a total of 48 containers 103 may be used. Increasing the number of LIMs supplying the CDLCs, increases the number of allowable containers in any one system. There is no limit to the number of LIMs that can be used in any one system. In FIG. 1C the LIM 130, supplies all top row CDLCs, and the LIM 131 supplies all bottom row CDLCs via the respective daisy chains 136, 137. The LIMs 130, 131 connect to the respective rows of containers 103 via corresponding conduits 132 as a single conduit is limited in the amount of power which it can deliver to remain intrinsically safe in an explosive atmosphere in accordance with the IECEx standards, as discussed below.

An intrinsically safe area is limited in the amount of electrical power which can flow into the area by any one conduit. Power (measured in Watts) is defined by the amount of energy (measured in Joules) per second. Electrical power is the rate in seconds in which electrical energy is consumed. The equation below defines electric power.

$$\text{Electric Power (W)} = \text{Joules (J)/time (sec)}$$

The two wire twisted pair 134 shown in FIG. 1B is the communications network medium between the LIM 114 and the CDLCs 113. The preferred communication method used with the medium 134 and the IT system connection 110 is a CANBUS protocol. Although the CANBUS protocol can operate up to 1 MHz, in the arrangements described herein the CANBUS 134 has an operating frequency limited to 10 kHz. The 10 kHz frequency limit, is implemented to stay within a predetermined slew rate limitation. Slew rate is the maximum rate of change of output voltage per unit of time and is expressed as volts per second.

Figure 2:
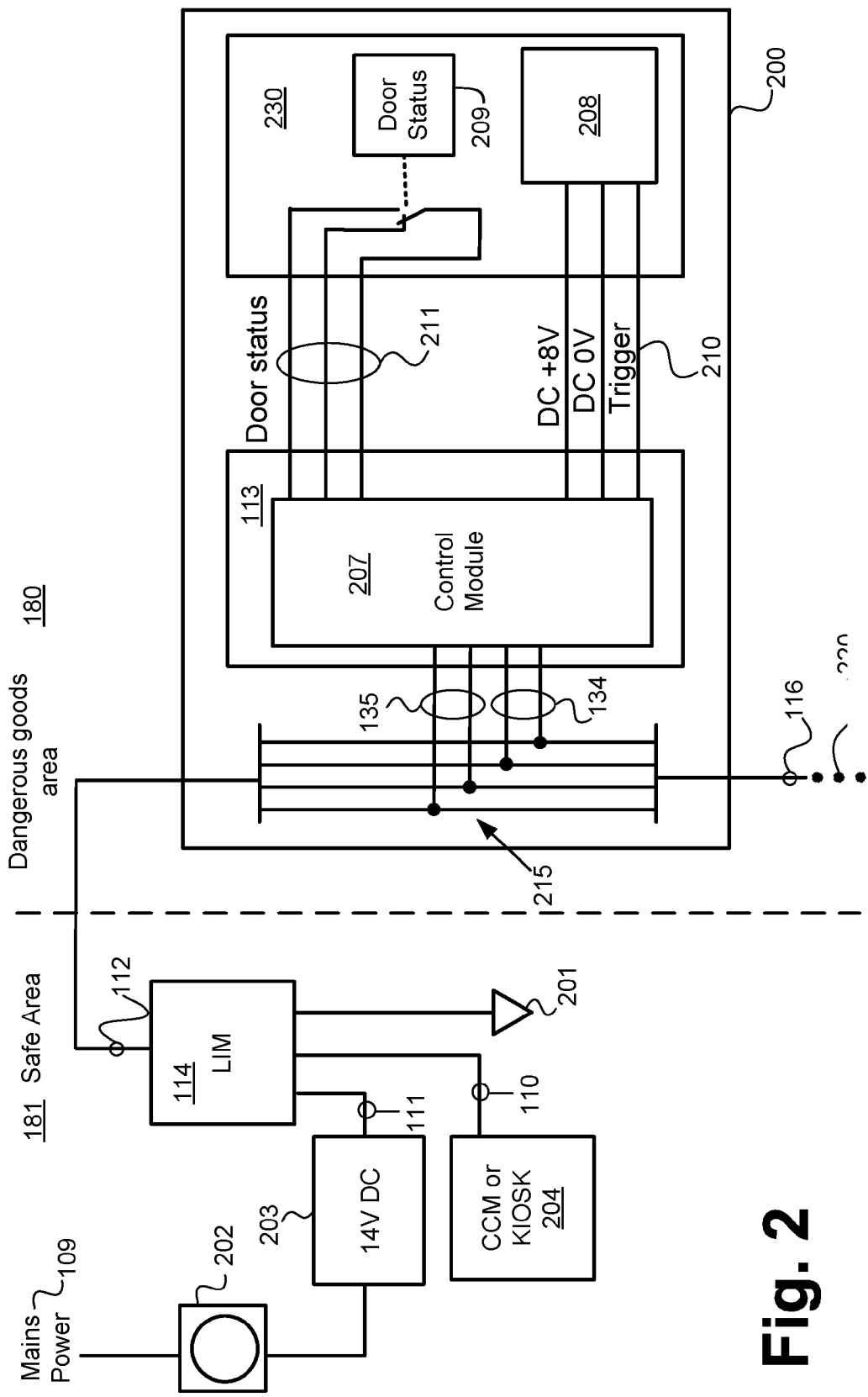
FIG. 2 shows schematic detail of the container door lock controller, and hazardous area latch.

FIG. 2 shows an exemplary container door lock controller (CDLC) 113 and a corresponding hazardous area latch (HAL) 230, configured in a lock enclosure (or a lock arrangement) 200, associated with a single one of the containers 103. The mains power 109 is typically a standard two wire 240 volts AC power supply which leads into an emergency stop 202. The emergency stop switch 202 is configured in the safe area 181 and is manually operable to stop electrical power flowing to the entire vending system 100. A DC power supply 203 converts the mains power 109 input into the 14 volt DC output 111 which supplies the LIM 114 arranged within the safe area 181.

The LIM 114 is configured to provide an intrinsically safe barrier between the safe zone 181 and the hazardous zone 180, as well as limiting the power input into the dangerous area 180. The safe barrier can be provided by, but not limited to, a combination of opto-isolators, fuses and crow bar protection circuitry.

Figure 6:
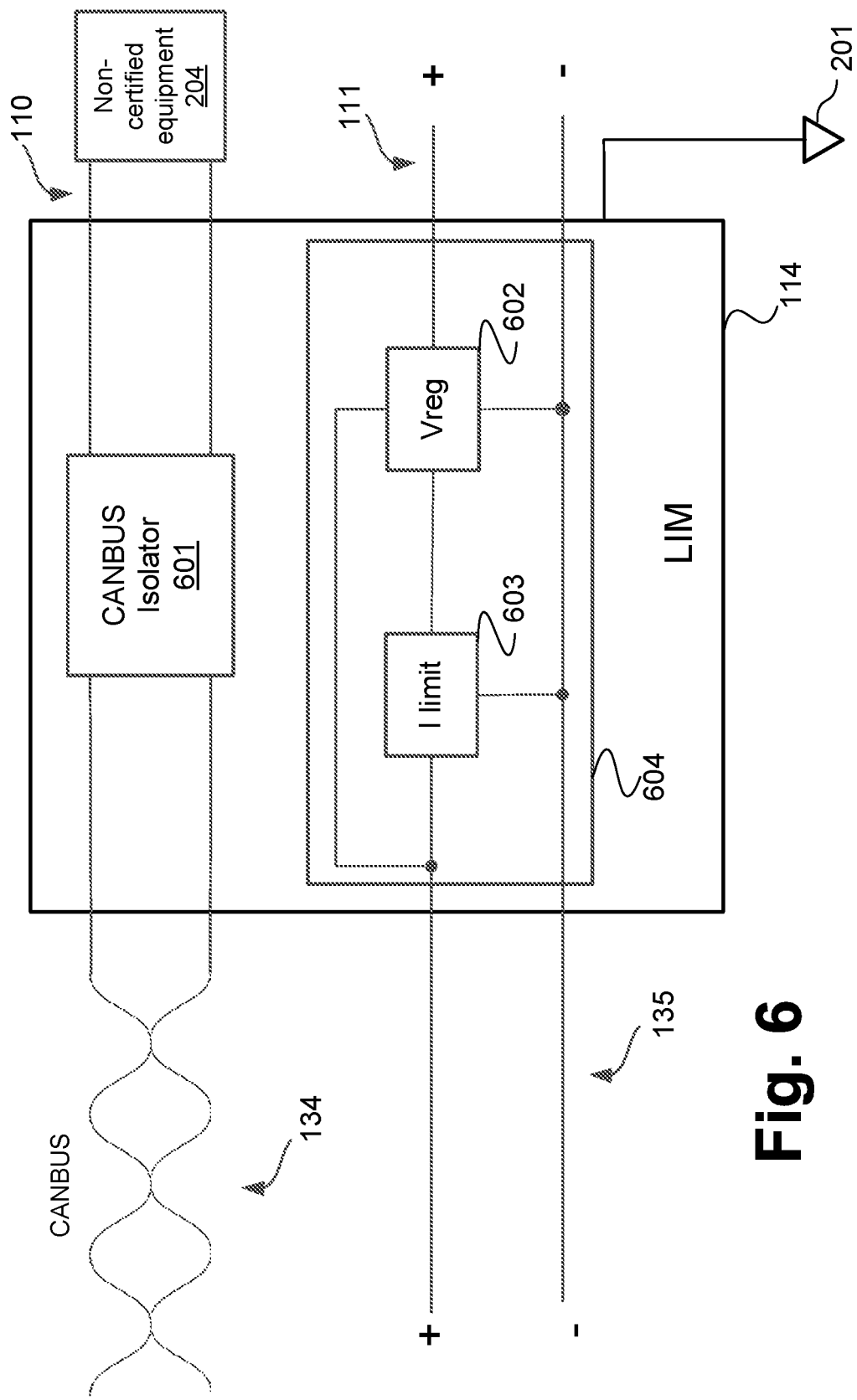
FIG. 6 shows schematic detail of the latch interface module (LIM)

FIG. 6 depicts a specific implementation of the LIM 114 which operates to interconnect non-certified equipment 204, such as the CCM 120 or kiosk 102 in the safe area 181, with certified equipment within the hazardous area 180. The LIM 114 has an earth connection 201 that must be connected at all times to ensure the continued integrity of the safety protection measures within the circuitry of the LIM 114. The LIM 114 also provides an isolated 2 wire CANBUS communication 134, via a CANBUS isolator 601, input from the IT connection 110. This isolation may readily afforded using opto-isolators. Also seen in FIG. 6, the DC supply 111 couples within the LIM 114 to a limited power supply module 604 which, in the specific implementations discussed herein is limited to provide 8 VDC on the power lines 135 to the containers 103 at a maximum current of 300 milliamps, giving a maximum available power from the LIM 114 of 2.4 Watts. The power consumed by the CANBUS 134 is considered to be comparatively negligible, and is in the order of milliwatts. The module 604 includes a voltage regulator 602 set to a maximum of 8 volts and a current limiter 603 set to limit current drawn by all connected containers 103 to a maximum of 300 mA. These devices may be implemented as noted above using fuses and crow-bar protection circuitry. As such the total amount of power available to the arrangement 101 in the hazardous area 180 is constrained to be within established levels in accordance with the IECEx standard. The LIM 114 therefore limits the amount of power delivered to all components within the dangerous goods area 181 to minimise and desirably obviate any chance of ignition of explosive materials.

Returning to FIG. 2, the hazardous area latch 230 is arranged to actuate the door 117 of the corresponding container 103. The CDLC 113 provides the logic necessary to trigger a latch mechanism of the HAL 230. The CDLC 113 includes connections 215 for the daisy chain 116 and receives the constrained power lines 135 and the CANBUS communication 134, whilst providing for conveyance to the next CDLC, indicated as 3 dots 220. The HAL 230 is responsible for opening the door 117 after receiving a trigger command 210 from a control module 207 of the CDLC 113. The HAL 230 includes an actuator 208 having a small permanent magnet motor with brushes and a commutator to move a locking mechanism of the latch into an unlocked position. The HAL 230 is of a slam shut design, which means the door 117 will manually swing open via a spring configured to open the door 117 when it is unlocked via actuation of the actuator 208. In order to lock, the door 117 must be manually closed. A door status sensor 209 detects an open/closed status of the door 117 and returns the status via a three wire configuration 211 to the control module 207. In the example illustrated in FIG. 2, the CDLC 113 and HAL 230 are shown as separate modules, with the CDLC 113 communicating to the controlling processor 170 via the LIM 114 and sending instructions to the HAL 230. In an alternative configuration, the CDLC and HAL may be combined into a single lock arrangement which activates the locking mechanism in addition to handling communications to and from the controlling processor 170.

The CDLCs 113 of the system 100 each have three modes of operation: standby, active, and sleep, which are established using communications from the controlling processor 170 and received by an internal processor (not illustrated) of the control module 207. Modes of operation are instructed via addressed communications over the CANBUS 134 to the CDLCs 113, each of which is individually addressable. In the standby mode of operation, the CDLC 113 listens for commands on the CANBUS 134 addressed to that particular CDLC 113. Listening on the CANBUS 134 uses a nominal amount of power (approximately 10 mA of the 8V supply per CDLC in a preferred configuration) sufficient to permit the CDLC 113 to receive instructions over the CANBUS 134. The active mode of operation of the CDLC 113 activates the corresponding HAL 230 to open the door 117. This mode uses an increased amount of power necessary to operate a mechanical lock using the actuator 208. The power required for this is about 180 mA of the 8V supply for each CDLC 113 in the preferred configuration. The sleep mode of operation of the CDLC 113 effectively shuts down the CDLC 113. When sleep mode is activated, the CDLC starts an internal predetermined timer, which when expired, returns the CDLC to the standby mode. Sleep mode uses a minimal amount of power, equivalent to about 0.1 mA per CDLC in the preferred configuration sufficient to run the internal timer and to subsequently return the CDLC to standby mode.

Each of the modes for each of the CDLCs 113 may be separately addressed and instructed by the controlling processor 170. In the preferred implementation, the standby mode is a default mode to which a CDLC 113 will return after each active mode and each sleep mode. As such, in the preferred implementation, only the active and sleep modes need be expressly instructed by the controlling processor 170

Control and management of operation of the vending arrangement 101 is managed by the controlling processor 170 within the kiosk 102 (FIG. 1A) or the CCM 120 (FIG. 1B). Communications commands, and responses, are conveyed via the connection 110 to the LIM 114 which simply provides electrical isolation between the CDLCs 113 and the processor 170 whilst permitting conveyance of communication signals.

The CDLCs 113 each listen for mode of operation commands received from the controlling processor 170 via the CANBUS connection 134. In one implementation the controlling processor 170 addresses an active mode command to a specific CDLC 113. The CDLCs which are not addressed in effect "hear" this command, because all CDLCs in the standby mode effectively "listen" to the CANBUS 134, and respond by entering the sleep mode to reduce power consumption. The sleeping CDLCs start a predetermined timer (e.g. 5 seconds). The specifically addressed CDLC 113 waits a shorter predetermined amount of time (e.g. 2 seconds), to ensure the other CDLCs have fully entered sleep mode. After the shorter predetermined amount time has expired, the specifically addressed CDLC 113 enters the active mode to unlock the corresponding door, and subsequently returns to standby mode. The non-addressed CDLCs' time expires and they each return to standby mode, awaiting the next addressed active mode instruction.

In another implementation, the communications conveyed by the CANBUS 134 individually addresses the mode commands to each CDLC 113. Here, the controlling processor 170 is interested in opening a singular desired CDLC, therefore the controlling processor 170 addresses a sleep mode command to all other CDLCs 113. The sleeping CDLCs start the 5 second timer before returning to standby mode. After sending the sleep command to all other CDLCs, the controlling processor 170 waits 2 seconds, and proceeds to send an active mode command to the singular desired CDLC 113. Once finished unlocking, the singular desired CDLC returns to standby mode before the 5 second timer expires on the sleeping CDLCs. When the 5 second timer expires, the controlling processor 170 may then continue to address the next command to the CDLCs 113.

Figure 5:
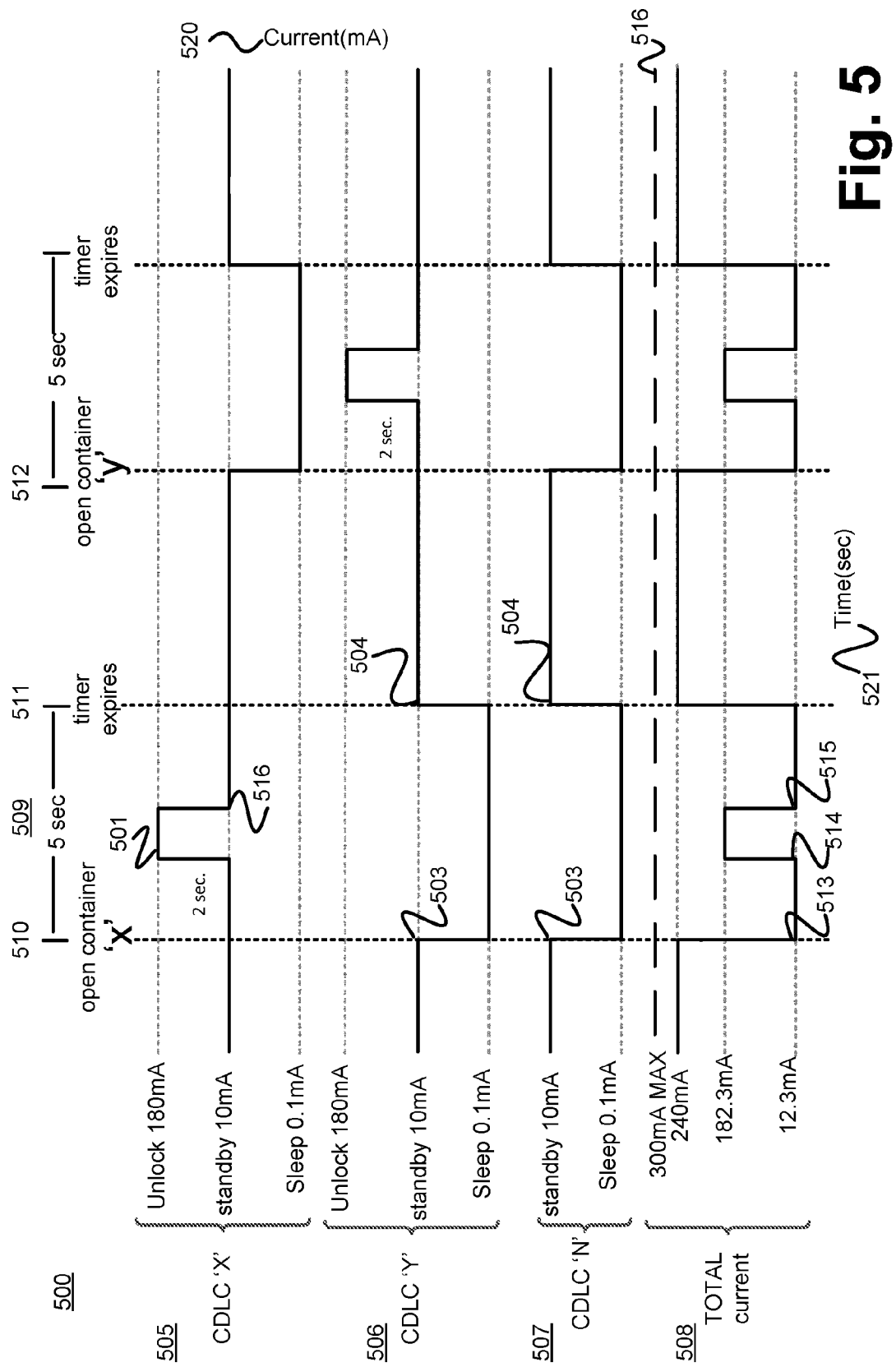
FIG. 5 shows an exemplary timing diagram of the normal operation of the vending apparatus.

FIG. 5 shows an exemplary timing diagram 500 which indicates the current drawn 520 over time 521 by the various modes of operation of the CDLCs. The amount of current drawn by the CDLCs used in this example are for illustrative purposes associated with the specific implementations described herein and are not otherwise limiting. CDLC 'X' 505 has a standby current consumption of 10 mA, a sleep consumption of 0.1 mA, and an unlock consumption of 180 mA. The same applies for each other CDLC 'Y' 506 and CDLC 'N' 507. CDLC 'N' represents each of the other containers, which in this example is an additional 22 containers. The total amount of current drawn from the LIM 114 is shown by the graph 508. There is a 300 milliamp maximum 516 as defined in the IECEx requirements for a zone 2 hazardous environment and limited by operation of the LIM 114.

Under steady state (non-activating) conditions, all CDLCs are in standby mode. In standby mode, each CDLC 113 draws 10 mA, giving for any one LIM 114, a maximum current supply/load of 240 mA, within the 300 mA supply constraint. When it is desired to unlock container 'X', a CANBUS instruction is sent to all CDLCs such that CDLC 'X' remains in standby mode and all other CDLCs are sent into sleep mode, by which their respective current draw drops significantly, to about 0.1 mA. The exemplary timing diagram 500 begins with an open container 'X' command 510. CDLC 'Y' 506 enters sleep mode 503 and CDLC 'N' 507 also enters sleep mode 503. This is shown by a drop in current consumption from 10 mA to 0.1 mA in each respective CDLC. The CDLCs in sleep mode (at this moment in time 'Y' and 'N') start a timer 509 before returning to standby mode, which in this example is 5 seconds. After the other CDLCs enter sleep mode 503 drawing a total of 12.3 mA (being 2.3 mA for the sleeping CDLCs and 10 mA for the CDLC waiting in standby mode), 2 seconds later, CDLC 'X' 505 enters the active mode 501, drawing 180 mA. At this point in time, the total current load on the LIM 114 is about 182.3 mA, well within the 300 mA limit. CDLC 'X' 505 finishes unlocking and returns to standby mode 516. When the 5 second timer expires 511, CDLC 'Y' 506 and CDLC 'N' 507 return to standby mode 504, consuming 10 mA each. As previously stated, the amount of current drawn from the CDLC 113 during active mode is 180 mA which, absent the change in mode from standby to sleep for the other CDLCs, would violate the restrictions set out in the IECEx standard by exceeding the 300 mA limit. For example, an attempt to open a latch of a container 103, without sending the sleep command would require a current draw of 410 mA (180 mA+23×10 mA), which is beyond the constrained 300 mA limit of the LIM 114 and would not be supplied. A second example further along the timeline at 512 indicates an open container 'Y' sequence. A generally similar sequence occurs with container 'Y' as occurred with container 'X'.

The operating limit of the LIM 114, being 300 mA in the described arrangement, is always adhered to. In the timing diagram 500, the total current drawn 508 shows the total used current peaking at a maximum of 240 mA, which leaves 60 mA of 'unused' current. However it should be noted that this 'unused' current of 60 mA is acting as a buffer for the expected CDLC current loads. The CDLC in standby mode is expected to draw 10 mA during standby, and 180 mA when active, however these expectations are approximate values under specific conditions. The CDLC 113 may draw less load, which is ideal, or it may draw more load which, if unaccommodated, could cause adverse effects on the system 100. The 60 mA buffer is implemented in the described arrangements to create a buffer during non-ideal or unexpected conditions.

Figure 3A:
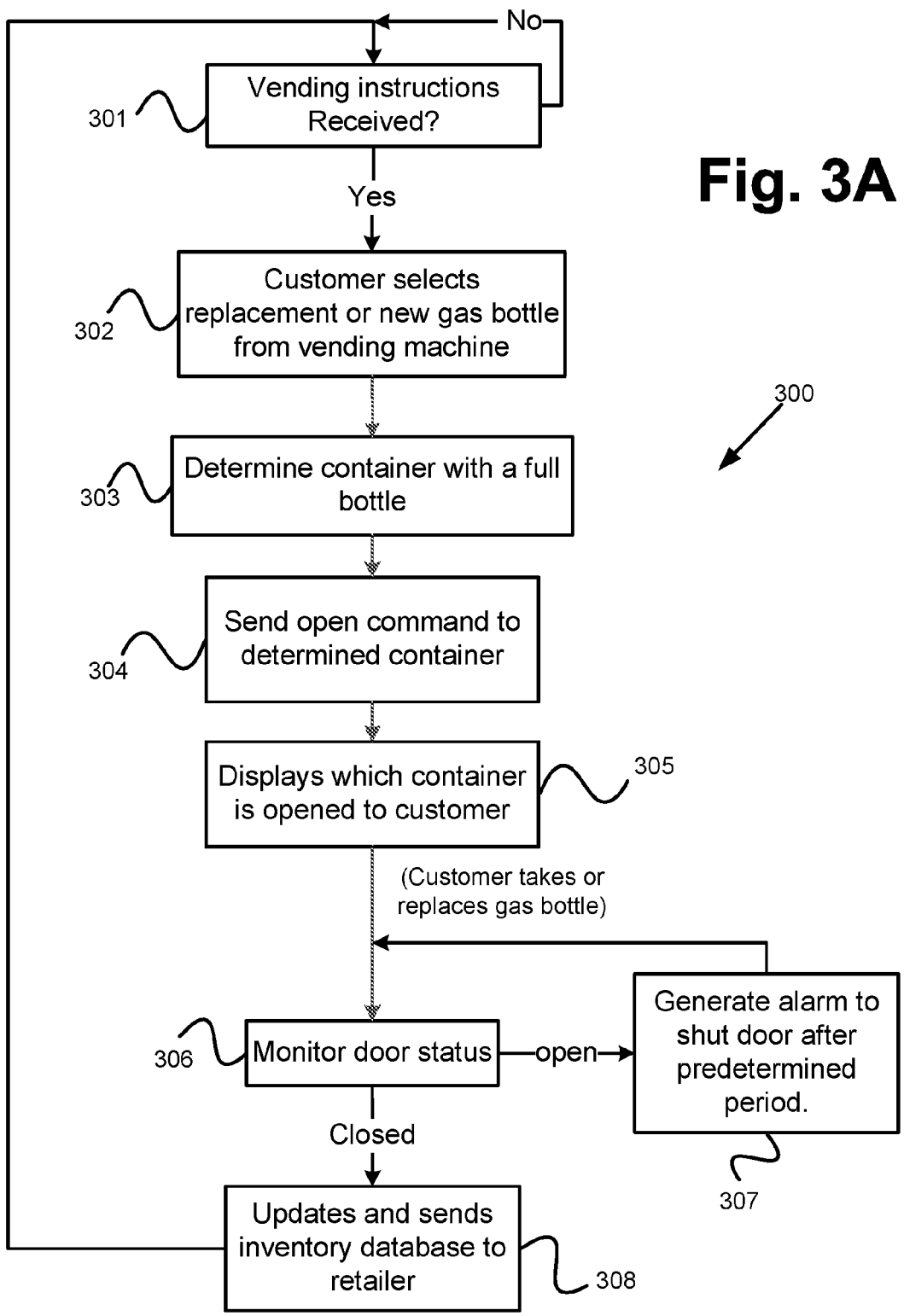
FIG. 3A is a schematic flow diagram of a normal operation procedure for the vending system.
Figure 3B:
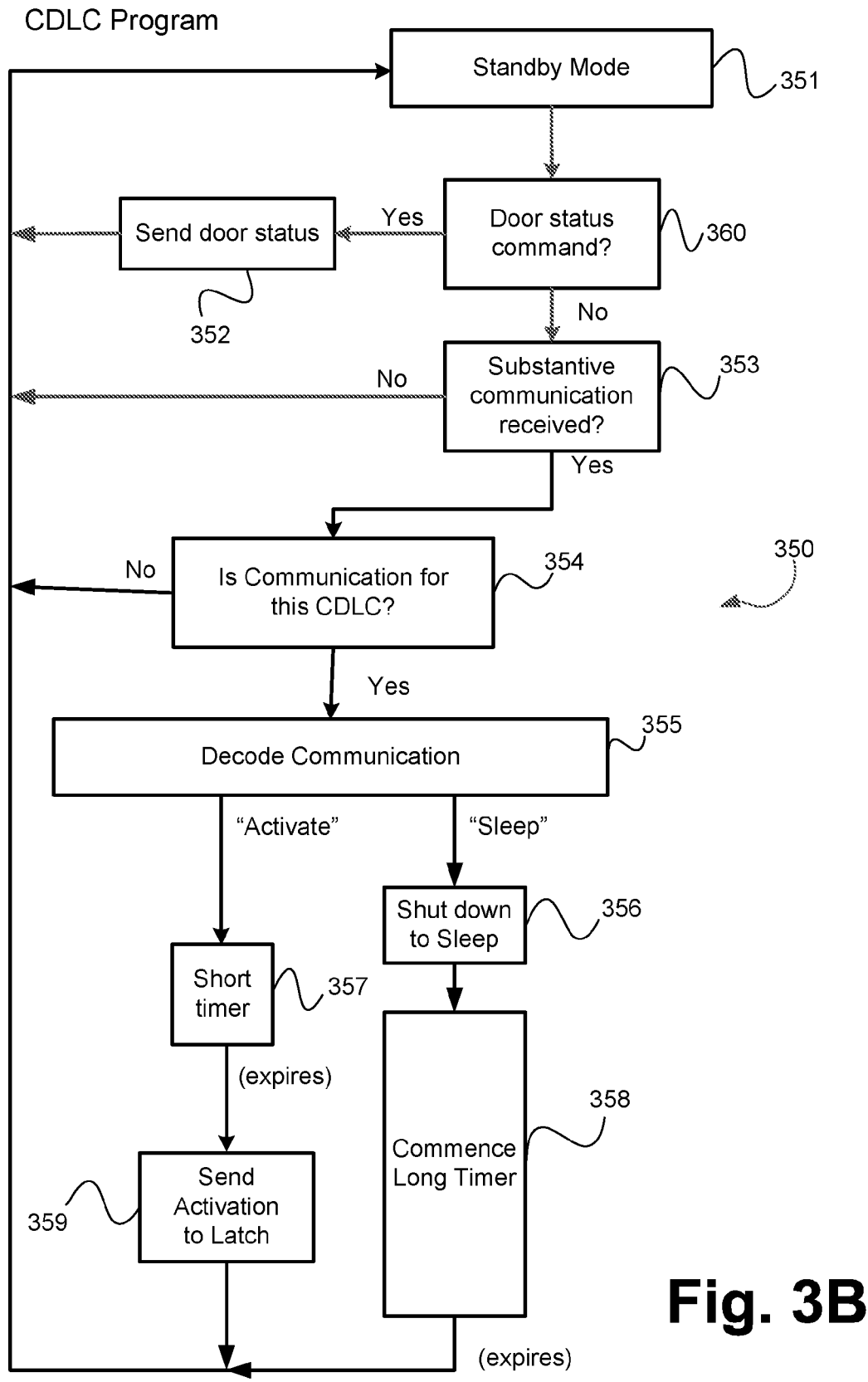
FIG. 3B is a schematic flow diagram of operation of a CDLC.

FIG. 3B is an exemplary schematic flow diagram 350 of the CDLC operation. A CDLC will remain in standby mode 351 and. as described above, listens for communications commands. At step 360 the CDLC 113 check to determine if a door status command is received. If so, the CDLC 113 obtains the door status from the sensor 209 and at step 352 returns a communication to the processor 170 including the corresponding door status (open/closed). Where a door status command is not received, step 353 follows to check for receipt of a substantive command. Where no substantive command is received control returns to step 351 where the CDLC 113 remains in the standby mode. If substantive communication is received 353, the CDLC 113 will determine if the communication is directed to itself, by matching the address. If not addressed to itself the CDLC will remain in standby mode 351. If the command is addressed to the particular CDLC 113, as checked in step 354, step 355 then follows to I decode the message. If a sleep command is decoded, the CDLC 113 will proceed to step 356 to shut down CDLC functions to consume less power and at step 358 start a long timer. When the long timer expires, concluding step 358, the CDLC 113 returns to the standby mode 351. If the activate command is decoded at step 355, step 357 follows where the CDLC will start a short timer which, once expired, proceeds to step 359 to sends the activation to the latch 208. Once activation is complete, for example by detecting the door status, the CDLC 113 returns to standby mode at step 351. The latch activation step 359 for any one CDLC should preferably finish before the long timer step 358 of other CDLCs expires.

In an alternative implementation mentioned above, the only substantive communication transmitted by the processor 170 may be an active mode command to a specific CDLC. In this implementation, any of the other CDLCs may at step 354 identify that an active command has been addressed to another CDLC and then automatically reverts to the sleep mode of steps 356 and 358, while the specifically addressed CDLC responds to the active command according to steps 357 and 359.

As such, as will be appreciated from the above, by managing the modes of operation of each container 103 via the corresponding CDLC 113 and HAL 230, the system 100 ensures that operation of all containers 103 for vending purposes is managed such that the intrinsically safe power limit of the power supply from the LIM 114 is never exceeded.

Figure 4:
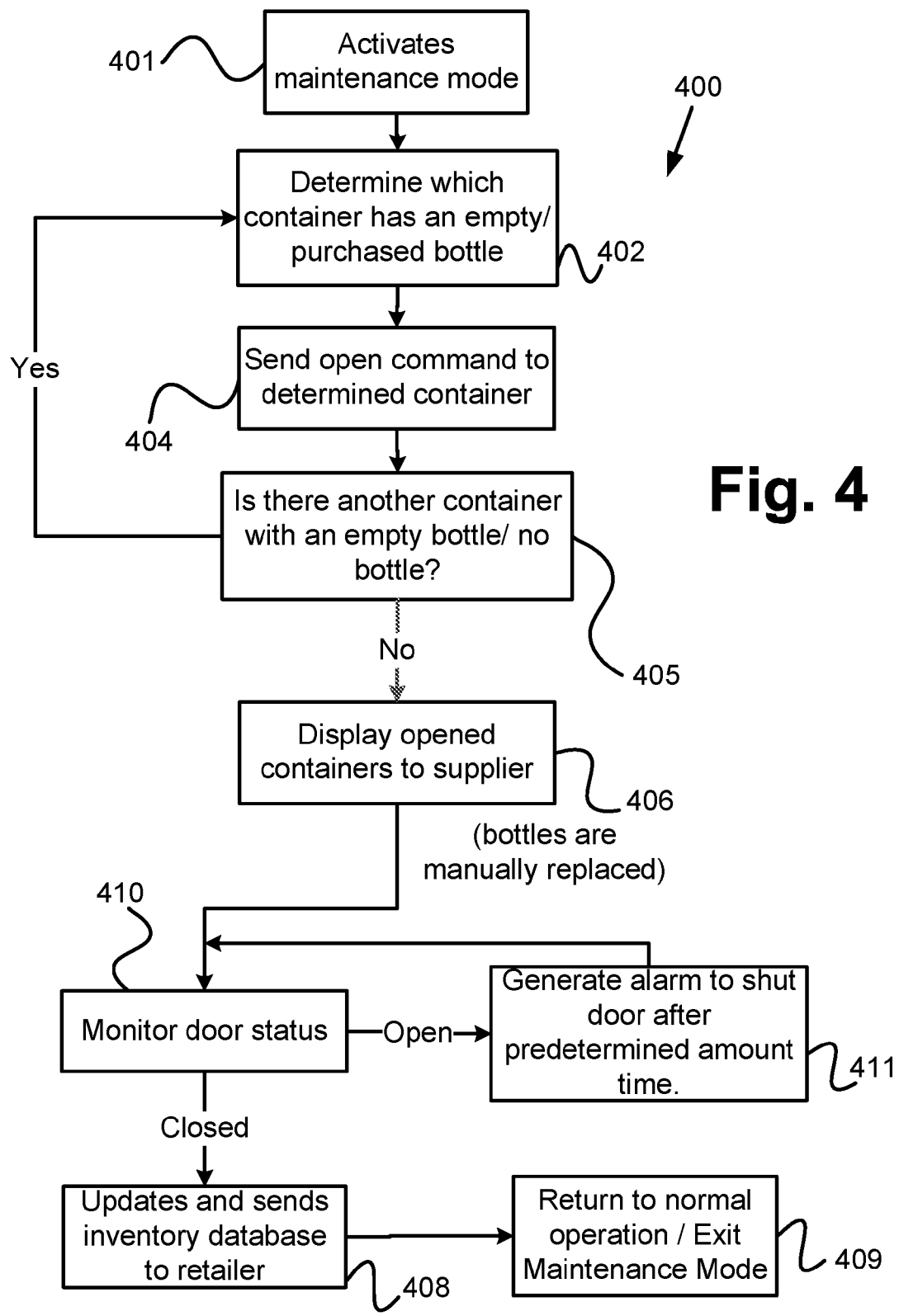
FIG. 4 is a schematic flow diagram of a maintenance mode operation.

FIG. 3A is a schematic flow diagram of a method 300 of a normal operation of the vending system 100 as implemented in software executable by the controlling processor 170 of the kiosk 102 or CCM 120. At step 301, the kiosk 102 or CCM 120 awaits receipt of a manually entered vending instruction, for example from user input to the kiosk 102 or the operator input to the tablet 119, for example after a payment process has been performed. At step 302 instructions to either purchase or replace a gas bottle, is received at the controlling processor 170. The controlling processor 170 then determines at step 303 the appropriate container 103 to open, and then at step 304 sends a CANBUS communications at least to the corresponding CDLC 113. A display on the tablet 119 or the GUI 107 of the kiosk 102 then displays at step 305 to the customer a representation of which container will open. Once the door has opened, a customer may then replace and/or take the gas bottle. At step 306, the controlling processor 170 monitors the door status 306 by requesting the door status from the CDLC via the sensor 209. If after a predetermined time period (e.g. 60 seconds) the door 117 is not shut, step 307 proceeds to cause an alarm to be emitted, essentially requiring the customer to close the door 117. This ensures that the doors are properly closed in order to perform the next vending instruction 301. When the customer manually closes the door of the opened container, step 306 detects the closure, the alarm is deactivated, and the vending system 100 at step 308 updates and sends inventory database information to the retailer via the 3G network connection 122. After the update is sent in step 308, the system returns to step 301 to await the next instructions. FIG. 4 is a schematic flow diagram of a method 400 of a maintenance mode of the vending system 100 and its interactions with a supplier, for example delivering replacement gas bottles to the vending system 100. At step 401, the supplier activates the maintenance mode 401 from either the kiosk 102 or the service station tablet 119. Once maintenance mode is activated, the controlling processor 170 determines at step 402 which container has an empty or a missing bottle. The processor 170 then sends to the determined container CDLC 113 an open command at step 404 resulting in CANBUS communications via the LIM 114. The controlling processor 170 will then ascertain if there is another empty/used bottle within the vending system 405 and repeat step 402 until all empty/used containers are open. The processor 170 will display the opened container(s) to the supplier 406 via the tablet 119 or the GUI 107 of the kiosk 102. The supplier restocks the container(s) while the controlling processor 170 is monitoring the door status of the containers at step 410. If the supplier does not manually shut all doors, an alarm will be generated at step 411 after a predetermined period, until all doors are shut. Once all the open container doors have been shut, the controlling processor 170 will update the inventory database at step 408 and return the vending system to normal operation and exit maintenance mode at step 409.

The preferred arrangements described above are founded upon specific components for the CDLC and latch actuator having current consumptions of 0.1 mA, 10 mA and 180 mA, in an 8V system, for each of the sleep, standby and active modes. These collectively predicate the nominal maximum number of 24 containers per LIM 114 to remain with the safe operating limit of 8 Vdc at a maximum of 300 mA. It will be appreciated therefore that using alternate components having differing power consumptions, may permit more than one container (lock arrangement) to be placed in the active mode at any one instant, whilst maintaining the intrinsically safe operating power level.

Further, for example in some situations, the 8 Vdc 300 mA supply constraint could be varied to, for example, 5 Vdc at 500 mA, thereby affording use of alternate components to achieve the same or substantially similar operation modes. Bearing these variables in mind renders different implementation possibilities.

The sleep mode was found necessary by the present inventors to drop the standby current consumption from 10 mA to 0.1 mA, to allow more current to be drawn by a CLDC during activation. As can be appreciated, with alternate componentry, the need to put all CDLCs into sleep mode to drop the current consumption to 0.1 mA may not be necessary. In some implementations, it may be sufficient to leave all non-active CDLCs in the standby mode whilst not exceeding the intrinsically safe power requirement.

With the various arrangements described, electrical apparatus may be used to vend hazardous substances, such as bottled gas, without exceeding intrinsically safe operating standards required for such product.

Figure 7A:
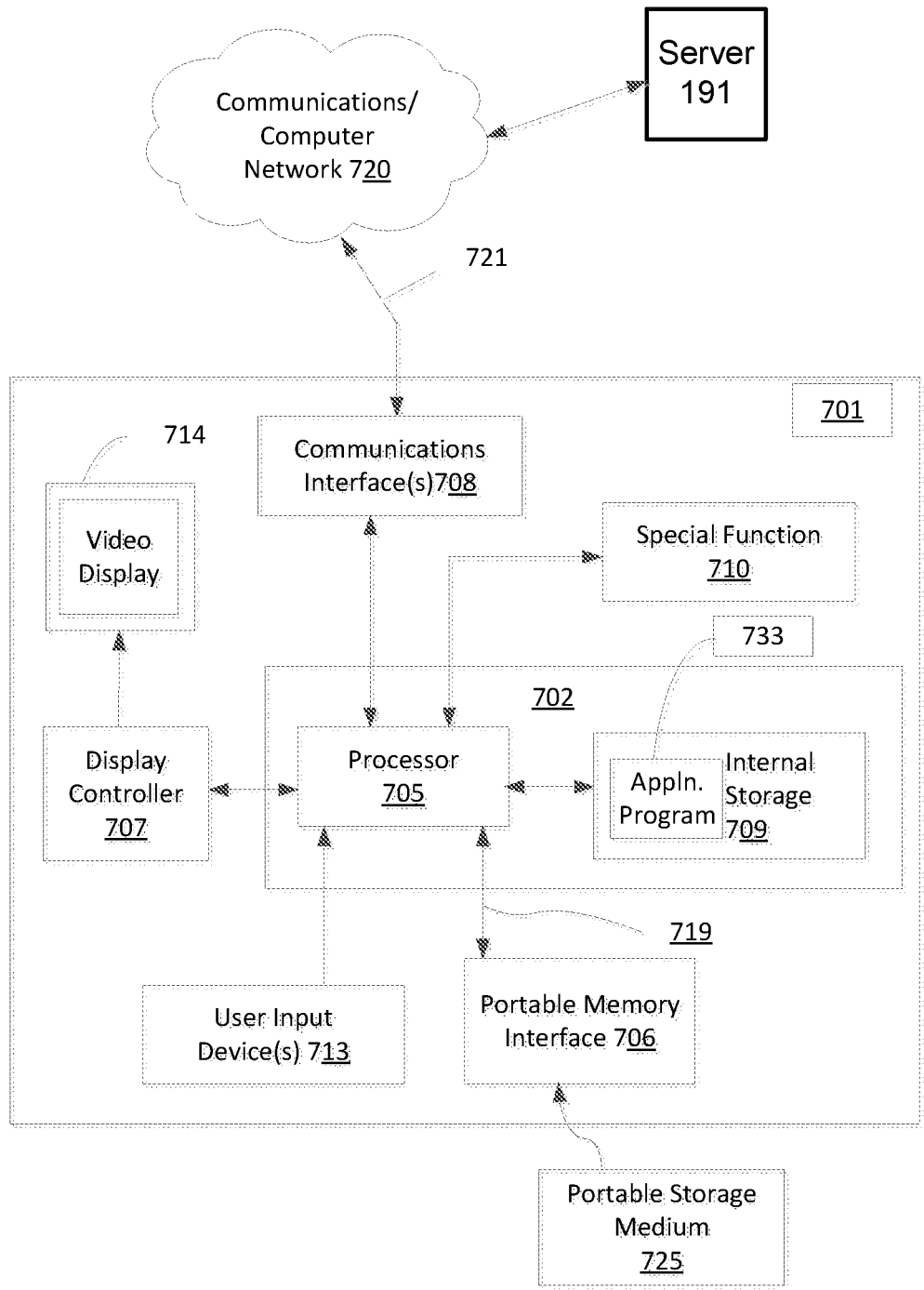
FIGS. 7A and 7B collectively form a schematic block diagram representation of an electronic device upon which arrangements described in relation to FIG. 1D can be practised.
Figure 7B:
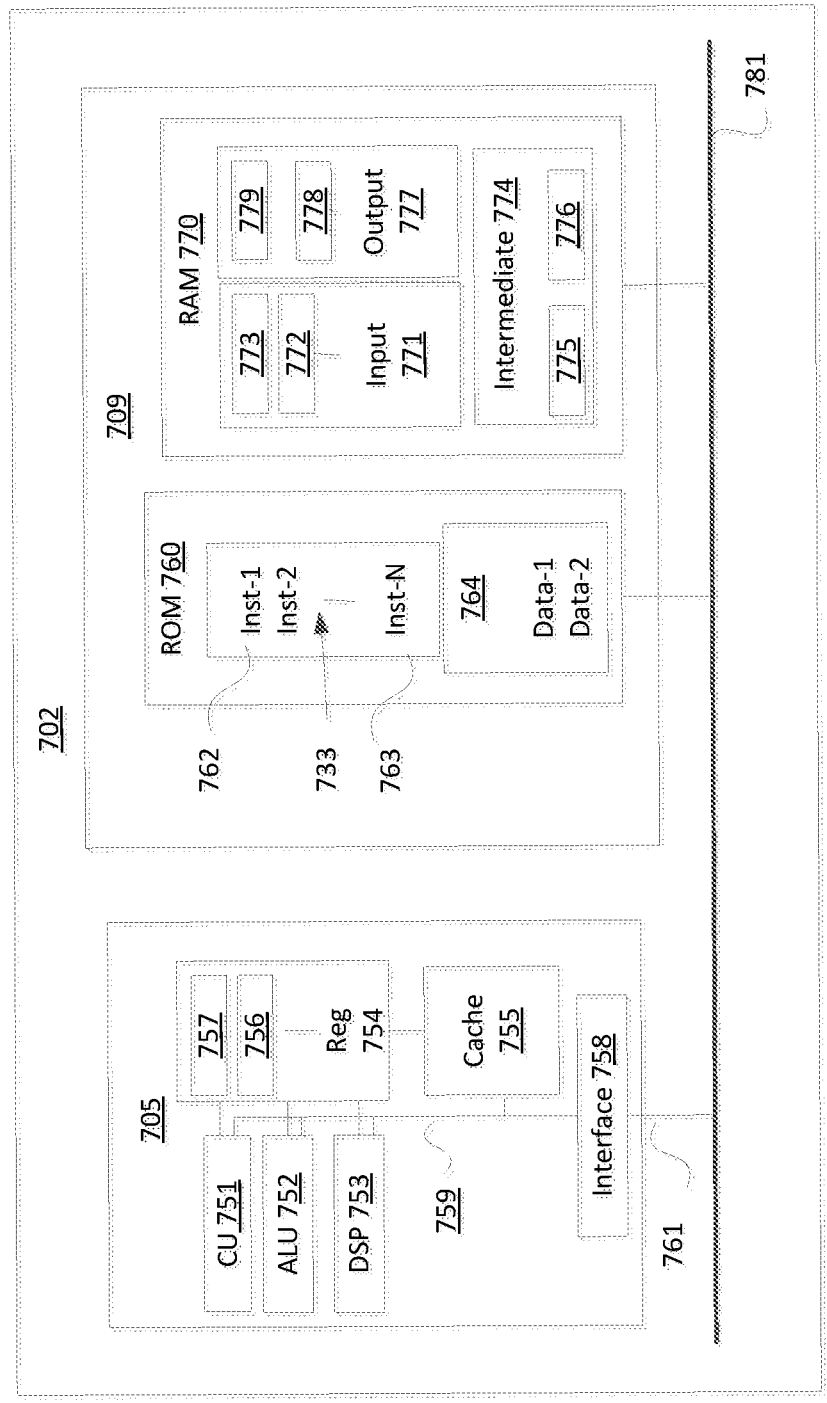
Figure 8:
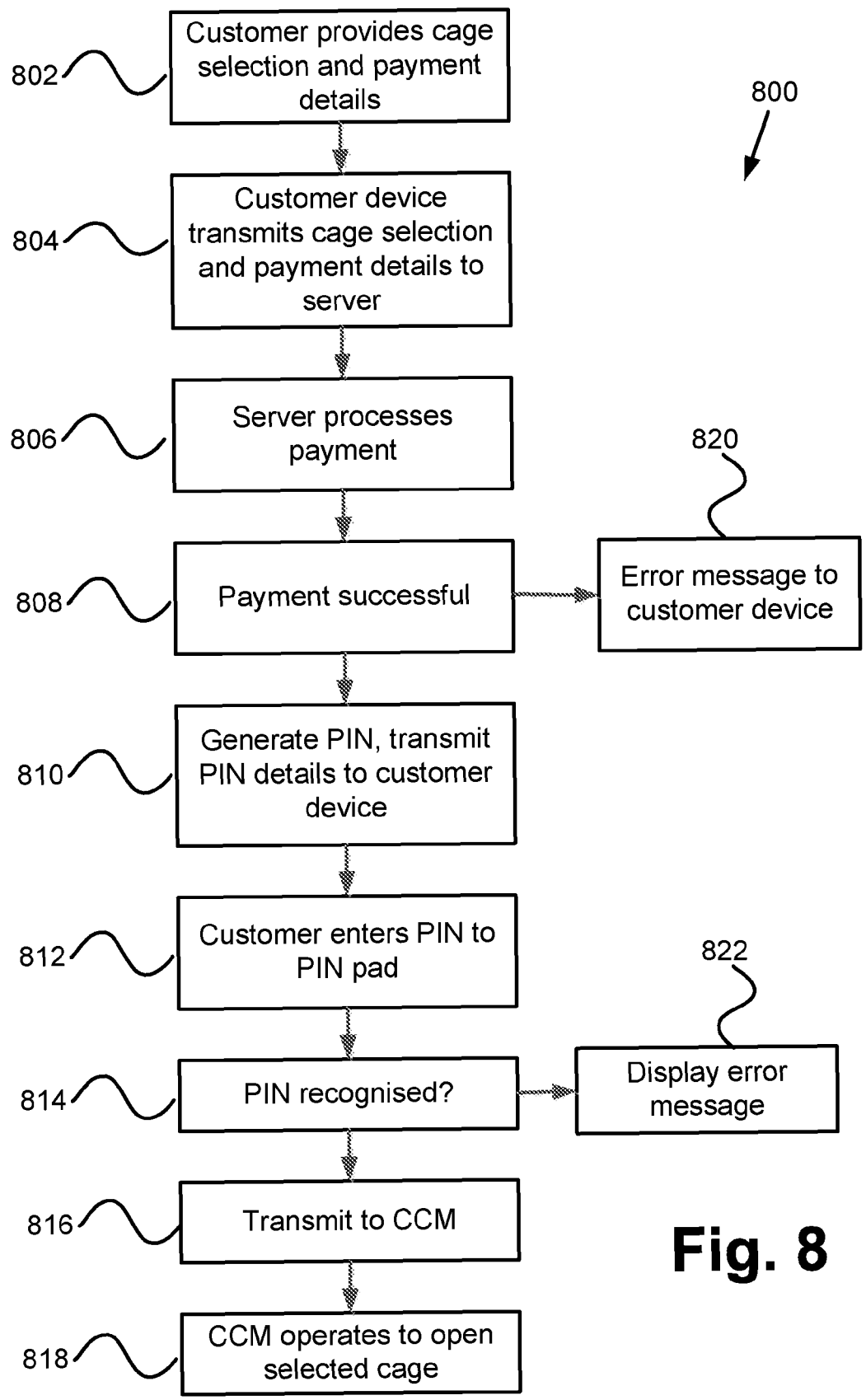
FIG. 8 shows a method of ordering and collecting a gas bottle using the arrangements of FIG. 1D.

FIGS. 7A and 7B collectively form a schematic block diagram of a general purpose electronic device 701 including embedded components, upon which the method to be described in relation to FIG. 8 is desirably practiced. The electronic device 701 forms the customer mobile device 199. The electronic device 701 may be, for example, a mobile phone, a tablet or any other personal electronics device capable of wireless communication in which processing resources are limited. Nevertheless, the methods to be described may also be performed on higher-level devices such as desktop computers, the server computer 191, and other such devices with significantly larger processing resources.

As seen in FIG. 7A, the electronic device 701 comprises an embedded controller 702. Accordingly, the electronic device 701 may be referred to as an "embedded device." In the present example, the controller 702 has a processing unit (or processor) 705 which is bi-directionally coupled to an internal storage module 709. The storage module 709 may be formed from non-volatile semiconductor read only memory (ROM) 760 and semiconductor random access memory (RAM) 770, as seen in FIG. 7B. The RAM 770 may be volatile, non-volatile or a combination of volatile and non-volatile memory.

The electronic device 701 includes a display controller 707, which is connected to a video display 714, such as a liquid crystal display (LCD) panel or the like. The display controller 707 is configured for displaying graphical images on the video display 714 in accordance with instructions received from the embedded controller 702, to which the display controller 707 is connected.

The electronic device 701 also includes user input devices 713 which are typically formed by keys, a keypad or like controls. In some implementations, the user input devices 713 may include a touch sensitive panel physically associated with the display 714 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 7A, the electronic device 701 also comprises a portable memory interface 706, which is coupled to the processor 705 via a connection 719. The portable memory interface 706 allows a complementary portable memory device 725 to be coupled to the electronic device 701 to act as a source or destination of data or to supplement the internal storage module 709. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 701 also has a communications interface 708 to permit coupling of the device 701 to a computer or communications network 720 via a connection 721. The connection 721 may be wired or wireless. For example, the connection 721 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the electronic device 701 is configured to perform some special functions. The embedded controller 702, possibly in conjunction with further special function components 710, is provided to perform that special function. For example, the device 701 is typically a mobile telephone handset. In this instance, the components 710 may represent those components required for communications in a cellular telephone environment. Where the device 701 is a portable device, the special function components 710 may represent a number of encoders and decoders of a type including Joint Photographic Experts Group (JPEG), (Moving Picture Experts Group) MPEG, MPEG-1 Audio Layer 3 (MP3), and the like.

The methods described below may be implemented using the embedded controller 702, where the processes of FIG. 8 may be implemented as one or more software application programs 733 executable within the embedded controller 702. The electronic device 701 of FIG. 7A implements the described method. In particular, with reference to FIG. 7B, the steps of the described methods are effected by instructions in the software 733 that are carried out within the controller 702. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 733 of the embedded controller 702 is typically stored in the non-volatile ROM 760 of the internal storage module 709. The software 733 stored in the ROM 760 can be updated when required from a computer readable medium. The software 733 can be loaded into and executed by the processor 705. In some instances, the processor 705 may execute software instructions that are located in RAM 770. Software instructions may be loaded into the RAM 770 by the processor 705 initiating a copy of one or more code modules from ROM 760 into RAM 770. Alternatively, the software instructions of one or more code modules may be pre-installed in a non-volatile region of RAM 770 by a manufacturer. After one or more code modules have been located in RAM 770, the processor 705 may execute software instructions of the one or more code modules.

The application program 733 is typically pre-installed and stored in the ROM 760 by a manufacturer, prior to distribution of the electronic device 701. However, in some instances, the application programs 733 may be supplied to the user encoded on one or more CD-ROM (not shown) and read via the portable memory interface 706 of FIG. 7A prior to storage in the internal storage module 709 or in the portable memory 725. In another alternative, the software application program 733 may be read by the processor 705 from the network 720, or loaded into the controller 702 or the portable storage medium 725 from other computer readable media. Computer readable storage media refers to any non-transitory tangible storage medium that participates in providing instructions and/or data to the controller 702 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 701. Examples of transitory or non-tangible computer readable transmission media that may also participate in the provision of software, application programs, instructions and/or data to the device 701 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 733 and the corresponding code modules mentioned above may be executed to implement one or more graphical user interfaces (GUIs) to be rendered or otherwise represented upon the display 714 of FIG. 7A. Through manipulation of the user input device 713 (e.g., the keypad), a user of the device 701 and the application programs 733 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 7B illustrates in detail the embedded controller 702 having the processor 705 for executing the application programs 733 and the internal storage 709. The internal storage 709 comprises read only memory (ROM) 760 and random access memory (RAM) 770. The processor 705 is able to execute the application programs 733 stored in one or both of the connected memories 760 and 770. When the electronic device 701 is initially powered up, a system program resident in the ROM 760 is executed. The application program 733 permanently stored in the ROM 760 is sometimes referred to as "firmware". Execution of the firmware by the processor 705 may fulfil various functions, including processor management, memory management, device management, storage management and user interface.

The processor 705 typically includes a number of functional modules including a control unit (CU) 751, an arithmetic logic unit (ALU) 752, a digital signal processor (DSP) 753 and a local or internal memory comprising a set of registers 754 which typically contain atomic data elements 756, 757, along with internal buffer or cache memory 755. One or more internal buses 759 interconnect these functional modules. The processor 705 typically also has one or more interfaces 758 for communicating with external devices via system bus 781, using a connection 761.

The application program 733 includes a sequence of instructions 762 through 763 that may include conditional branch and loop instructions. The program 733 may also include data, which is used in execution of the program 733. This data may be stored as part of the instruction or in a separate location 764 within the ROM 760 or RAM 770.

In general, the processor 705 is given a set of instructions, which are executed therein. This set of instructions may be organised into blocks, which perform specific tasks or handle specific events that occur in the electronic device 701. Typically, the application program 733 waits for events and subsequently executes the block of code associated with that event. Events may be triggered in response to input from a user, via the user input devices 713 of FIG. 7A, as detected by the processor 705. Events may also be triggered in response to other sensors and interfaces in the electronic device 701.

The execution of a set of the instructions may require numeric variables to be read and modified. Such numeric variables are stored in the RAM 770. The disclosed method uses input variables 771 that are stored in known locations 772, 773 in the memory 770. The input variables 771 are processed to produce output variables 777 that are stored in known locations 778, 779 in the memory 770. Intermediate variables 774 may be stored in additional memory locations in locations 775, 776 of the memory 770. Alternatively, some intermediate variables may only exist in the registers 754 of the processor 705.

The execution of a sequence of instructions is achieved in the processor 705 by repeated application of a fetch-execute cycle. The control unit 751 of the processor 705 maintains a register called the program counter, which contains the address in ROM 760 or RAM 770 of the next instruction to be executed. At the start of the fetch execute cycle, the contents of the memory address indexed by the program counter is loaded into the control unit 751. The instruction thus loaded controls the subsequent operation of the processor 705, causing for example, data to be loaded from ROM memory 760 into processor registers 754, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 733, and is performed by repeated execution of a fetch-execute cycle in the processor 705 or similar programmatic operation of other independent processor blocks in the electronic device 701.

Referring to FIG. 1D, in order to use the self-service configuration 190, a customer 194 downloads an application (such as the application 733) from the server 191 to the customer mobile device 199, using known methods such as an interface 199a and a connection 191c. The interface 199a may be a wireless interface similar to the interface 121 or may have 3G capability. The connection 191c typically comprises a combination of wired or wireless connections to interface with the device 199, and may be represented by the connection 721 of FIG. 7A. The application 733 is configured for execution on a corresponding operating system of the mobile device 199, such as Apple 10S, Google Android, and the like. The customer 194 may be remote from the self-service arrangement 190 in downloading the application 733 to the customer mobile device 199. The application 733 executes on the customer mobile device 199 under control of the processor 705 to display information regarding the cages to the customer 194.

FIG. 8 shows a method 800 by which the customer 194 orders and collects a gas bottle using the application 733 installed on their mobile device 199. The method 800 starts at a step 802. At step 802, the customer 194 operates the mobile device 199 to select one of the cages using the application 733 executing on the mobile device. The customer manipulates the mobile device 199 to provide payment details on selecting the cage. The selection includes a product and quantity—for example a number of gas bottles of a particular size.

The method 800 continues to step 804. The application 733 executes on the device 199 at step 804 to transmit the cage selection and the payment details to the server computer 191. The method 800 then continues to step 806. The server computer 191 operates to process the payment with a financial institution at step 806, in a similar manner to the kiosk 102 of FIG. 1A. The payment transaction may be processed using known methods such as PayPal, for example. The method 800 continues to step 808, at which the server computer 191 operates to determine if the payment was successful. If the payment was successful, ('Y' at step 808), the method 800 continues to step 810. Otherwise, the method 800 continues to a step 820. The server computer 191 generates an error message at step 820 and transmits the error message to the mobile device 199 for display on the video display 714 via execution of the application 733.

At step 810, the server computer 191 operates to generate a unique transaction-specific number, referred to as a PIN. The PIN is typically of numeric form such that the customer can enter the PIN to the PIN pad 198. The PIN is normally generated as random number using known random number generation methods. The server computer 191 executes checks to ensure a previously-issued PIN is not duplicated for another transaction. The server computer 191 associates the PIN with the selected cage and the processed payment. The server computer 191 transmits the PIN to the consumer device 199.

The method 800 continues to step 812 when the customer 194 attempts to retrieve the selected gas bottle from the selected cage. In order to collect the gas bottle from the selected cage, the customer 194 must be physically present at the self-service arrangement 190. The customer 190 retrieves the PIN from the mobile device 199 and enters the PIN to the PIN pad 198 at step 812.

The method 800 then continues to a step 814, where the to the self-service arrangement 190 determines if the PIN entered by the customer 194 is valid. The PIN pad 198 transmits the PIN to the CCM 120 at step 814. The CCM 120 transmits the PIN to the server 191 for verification. The server 191 operates to determine if the PIN is "true" or recognised as being associated with a transaction. If the PIN entered by the customer is recognised, the server computer 191 transmits an "open" command and data associated with the PIN pad 198 and the selected cage to the CCM 120. The method 800 continues to step 816 if the PIN is recognised at the step 814. Otherwise, if the PIN is not recognised ('N at step 814), the method 800 continues to a step 822. At step 822 the server computer 191 transmits information indicating an error to the CCM 120. The CCM 120 transmits information relating to the error to the PIN pad 198. The PIN pad 198 provides an error indicator to the customer 194, for example by displaying an error message, using an indicator light, using sound, or the like.

At step 816 the server 191 transmits information indicating that the entered PIN is recognised to the CCM 120. The information transmitted to the CCM 120 includes information regarding the selected cage. The method 800 continues to step 818, where the CCM 120 operates to open the selected cage, in the manner described above for the arrangements of FIGS. 1A to 1C.

The foregoing describes only some aspects of the present invention, and modifications and/or changes can be made thereto without departing from the scope and spirit of the invention, the aspects being illustrative and not restrictive. For example, other hazardous substances may also be distributed in a similar fashion. Such may include ammunition, mixed fuel such as 2-stroke, chemicals, batteries, to name but a few.

The claims defining the invention are as follows:

1. A vending system for supply of product from a plurality of containers each having a corresponding access door having an electrically activatable lock arrangement, the system comprising an interface module by which a predetermined maximum electrical power is made available for supply to the containers and lock arrangements such that each lock arrangement has a plurality of operational modes, the modes comprising:
   an active mode by which the lock arrangement is activatable in response to a vending instruction;
   a standby mode by which the lock arrangement awaits a vending instruction; and
   a sleep mode by which the lock arrangement minimises power drawn from the interface module;
   wherein the interface module operates the lock arrangements in the standby mode; and
   the interface module operates at least one lock arrangement in the sleep mode, and at least one lock arrangement in the active mode.

2. A vending system according to claim 1 wherein:
   the interface module operates all lock arrangements in the standby mode; and
   then operates all the lock arrangements except a singular lock arrangement in the sleep mode and the singular lock arrangement in the active mode.

3. The vending system according to claim 2 wherein the interface module is located within a first area and the plurality of containers are located within a second area, separated from the first area, in which the second area has access to a limited maximum of electrical power.

4. The vending system according to claim 2 wherein the lock arrangement comprises a lock controller which controls a door locking mechanism of the corresponding container.

5. The vending system according to claim 4 wherein the lock controller receives operational modes from the interface module and decodes the modes for operation of the lock controller.

6. The vending system according to claim 2 wherein the interface module is a predetermined minimum distance from the plurality of containers.

7. The vending system according to claim 2 wherein the interface module communicates to the lock arrangement with a communication protocol at a limited frequency.

8. The vending system according to claim 1, wherein the maximum electrical power is constrained by a maximum current and a maximum voltage according to a standard relating to equipment for use in explosive atmospheres.

9. The vending system according to claim 1, wherein the maximum electrical power is constrained by a maximum voltage value of 8 volts and a maximum current value of 300 mA.

10. An apparatus comprising:
    a plurality of controllers each associated with a corresponding activatable latch, each controller being configured to cause actuation of the corresponding latch; and
    an interface module by which a predetermined maximum amount of electrical power is made available for supply to the plurality of controllers and latches,
    wherein each controller is operable in at least two operational modes, the modes comprising:
       an active mode by which the controller actuates the corresponding latch; and
       a standby mode by which the controller awaits instructions from the interface module,
    such that any combination of the operational modes is within the predetermined maximum amount of electrical power.

11. The apparatus according to claim 10 further comprising:
    a sleep mode by which the controller minimises power usage from the interface module.

12. The apparatus according to claim 10 wherein the interface module is located within a first area and the plurality of control modules are located within a second area, separated from the first area, in which the second area has access to a limited maximum of electrical power.

13. Apparatus according to claim 10, further comprising:
    a vending unit by which vending commands are issued according to the operational modes; and
    a communications network interconnecting the vending controller and each of the controllers via the interface module and adapted to convey the vending commands to cause operation of the controller and corresponding latches according to the operational modes
    wherein the interface module is configured to provide electrical isolation between the vending unit and the controllers and latches with respect to the communications network and the supply of the electrical power to the controllers and latches.

* * * * *